UNITED STATES PATENT OFFICE.

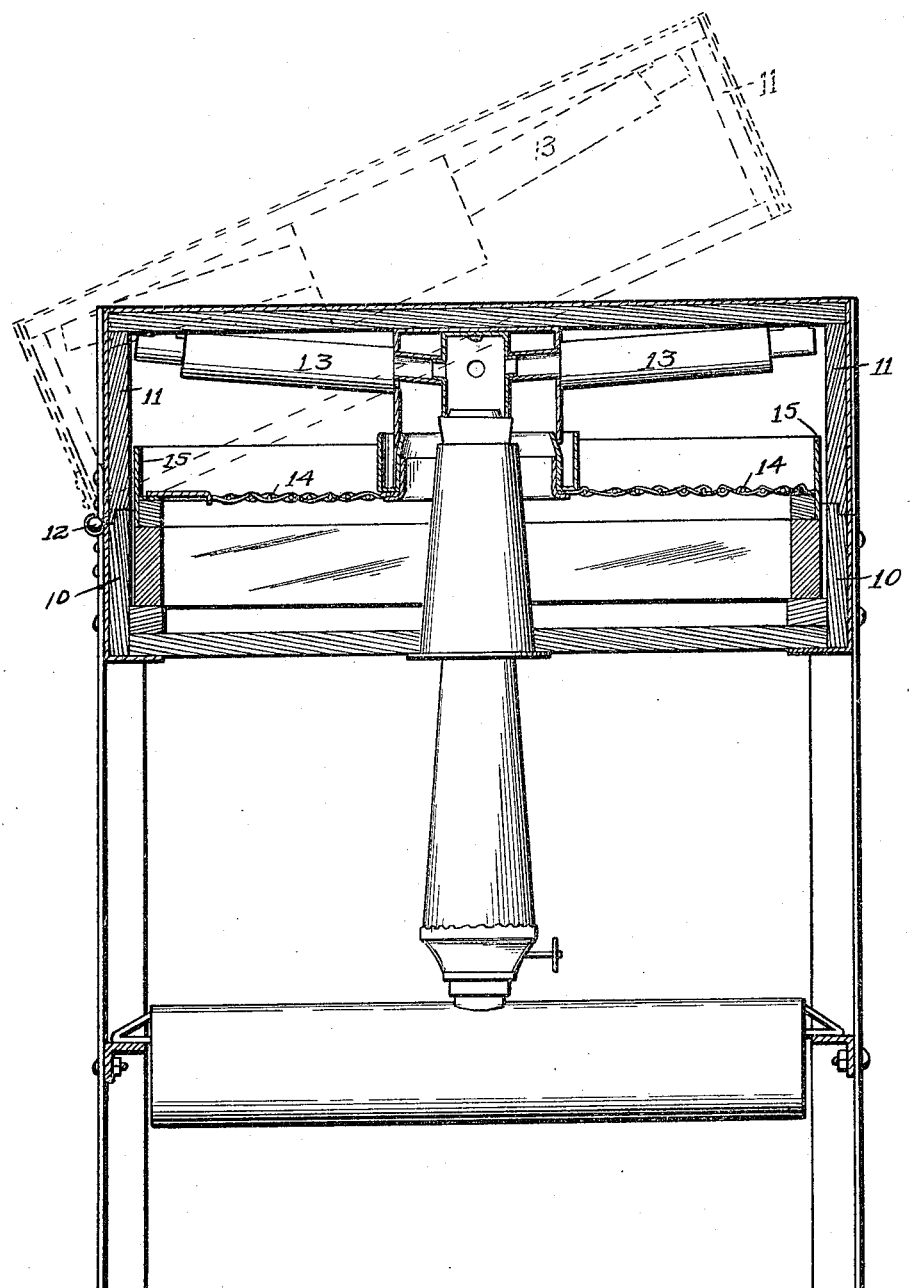

JOHN H. KATE, OF DES MOINES, IOWA, ASSIGNOR, BY DIRECT AND MESNE ASSIGNMENTS TO X RAY INCUBATOR COMPANY, OF DES MOINES, IOWA, A CORPORATION OF IOWA.

INCUBATOR.

1,231,029.  Specification of Letters Patent.  Patented June 26, 1917.

Application filed August 30, 1916. Serial No. 117,665.

*To all whom it may concern:*

Be it known that I, JOHN H. KATE, a citizen of the United States, and resident of Des Moines, in the county of Polk, and State of Iowa, have invented a certain new and useful Incubator, of which the following is a specification.

My invention relates to that class of incubators that are designed to be heated by lamp, and that are provided with hinged top portions which are raised when it is desired to obtain access to the interior of the incubator.

My object is to provide an incubator of this class with the parts so arranged and combined relatively to each other and to the egg tray, that when the hinged top is closed any cold air that might enter the joint between the hinged top and the body portion will pass downwardly into the body of the incubator below the egg tray and will not strike directly upon the eggs in the tray, and further in this connection to provide an incubator of this class so arranged that the heat radiating flues connected to the hinged cover are contained in a hinged cover of such depth that the hinged cover may be opened to a considerable extent to permit access by the operator's hand to the egg tray without permitting the escape of all of the heat from the heat radiating flues and from the interior of the hinged top of the incubator, to thereby reduce the probability of injuriously chilling the eggs in the egg tray when access is being had to the eggs for purposes of turning them, etc.

My invention consists in the construction, arrangement and combination and the various parts of the device, whereby the objects contemplated are attained, as hereinafter more fully set forth, pointed out in my claim, and illustrated in the accompanying drawings, in which:

The incubator is illustrated in vertical section. The dotted lines in the figure show the hinged cover in a slightly raised position whereby the operator may have access to the interior of the incubator without losing the major portion of the heat contained therein.

Referring to the accompanying drawings, I have used the reference numeral 10 to indicate the lower or stationary part of the incubator body, and 11 the upper or hinged member thereof connected to the body portion by the hinges 12. In this connection especial attention is called to the fact that the sides of the upper or hinged member are relatively deep so that the hinged member may be opened to a considerable extent, as shown by dotted lines in the drawing, without permitting a major portion of the heated air contained in the incubator to escape during the time that the incubator top is opened.

Contained in the hinged top is a series of hot air radiating flues 13 of ordinary construction.

The egg tray indicated generally by the numeral 14 is supported in the lower or stationary member of the incubator body, and the sides of the egg tray are preferably made of sheet metal 15 and stand slightly spaced apart from the side walls of the incubator body. I preferably arrange the bottom of the egg tray at or above the joint between the upper and lower incubator body portions, although this is not always essential if the sides of the egg tray project well above the joint between the upper and lower body portions.

By this arrangement it will be noted that in the event that the joint between the upper and lower members of the incubator body is not air tight, cold air entering through this joint will strike the solid side wall of the egg tray and by gravity descend to the lower part of the incubator body and travel over to the heating element in the center of the lower part, where it will be heated before being distributed into the space occupied by the eggs on the egg tray.

In incubators in which the top of the side walls of the egg tray are arranged below the joint between the upper and lower incubator body portions, then cold air leaking in through the joint will impinge directly upon some of the eggs, at least, contained in the egg tray and this is likely to chill such eggs to such an extent as to prevent them from hatching, but by reason of my improvement this danger is avoided even in the event that an appreciable leakage of cold air should enter the incubator through the joint.

Another marked advantage in connection with this same improvement is that when the side walls of the top are extended downwardly to a point adjacent to the bottom of the egg tray, the hinged cover may be raised enough to permit the operator's hand to be inserted therein for turning the eggs without losing the major portion of the heat contained therein, as the heat always rises toward the top of the cover and will be retained therein and in the radiating system carried by the top even if the hinged cover is opened when the surrounding atmosphere is relatively cold. Hence a double advantage is gained by reason of this improved construction.

I claim as my invention:

In an incubator, a lower body member having a heating element therein, an upper body member also having a heating element therein, means for hinging the upper body member to the lower body member, an egg tray detachably supported in substantial alinement with the upper edges of the lower body member, said egg tray having its sides extended above and below the upper edges of the lower body member and also spaced from the sides thereof whereby the tray may be accessible for removal when the upper body member is swung open and whereby a flue is formed, which both prevents a direct lateral draft upon the eggs and which is adapted to conduct any air, which enters through the joint between the body members down to the heating element in the lower body member.

Des Moines, Iowa, August 17, 1916.

JOHN H. KATE.

Copies of this patent may be obtained for five cents each, by addressing the "Commissioner of Patents, Washington, D. C."